(12) United States Patent
Fan Chiang et al.

(10) Patent No.: US 11,348,417 B2
(45) Date of Patent: May 31, 2022

(54) SMART DOORBELL SYSTEM AND CHIME CIRCUIT

(71) Applicant: PEGATRON CORPORATION, Taipei (TW)

(72) Inventors: Chao-Tung Fan Chiang, Taipei (TW); Chao Ching Yen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 30 days.

(21) Appl. No.: 17/137,126

(22) Filed: Dec. 29, 2020

(65) Prior Publication Data

US 2021/0287498 A1 Sep. 16, 2021

(30) Foreign Application Priority Data

Mar. 10, 2020 (TW) .................................. 109107857

(51) Int. Cl.
*G08B 3/10* (2006.01)
*H02M 7/217* (2006.01)
(52) U.S. Cl.
CPC .......... *G08B 3/1008* (2013.01); *H02M 7/217* (2013.01)
(58) Field of Classification Search
CPC ....... G08B 3/1008; G08B 3/10; H02M 7/217; H02M 1/10; H02M 3/335; H04M 11/025
See application file for complete search history.

(56) References Cited

U.S. PATENT DOCUMENTS

| 10,311,685 | B1 | 6/2019 | Long et al. |
| 10,567,711 | B1* | 2/2020 | Skeoch ................... H02M 7/02 |
| 10,609,344 | B1* | 3/2020 | Tso ......................... H04N 7/186 |
| 2019/0013682 | A1 | 1/2019 | Jeon |

FOREIGN PATENT DOCUMENTS

CN 1418020 5/2003

OTHER PUBLICATIONS

"Search Report of Europe Counterpart Application", dated Jun. 28, 2021, pp. 1-9.

* cited by examiner

*Primary Examiner* — Mohamed Barakat
*Assistant Examiner* — Sharmin Akhter
(74) *Attorney, Agent, or Firm* — J.C. Patents

(57) ABSTRACT

A smart doorbell system includes a doorbell switch, an input device, a chime circuit, and a ring circuit. A chime circuit includes a power connection terminal and a first rectifier circuit and a second rectifier circuit coupled to the power connection terminal and connected in parallel. The power connection terminal receives an alternating current including a first direction current and a second direction current that alternate. The input device is coupled to the chime circuit and generates a control signal. The control signal controls one of the first and second direction currents to pass through a corresponding one of the first and second rectifier circuits. The doorbell switch is coupled to the chime circuit and the ring circuit. A trigger signal is generated through the other one of the first and second direction currents when the doorbell switch is pressed, such that the ring circuit produces a ringing sound.

11 Claims, 4 Drawing Sheets

US 11,348,417 B2

SMART DOORBELL SYSTEM AND CHIME CIRCUIT

CROSS-REFERENCE TO RELATED APPLICATION

This application claims the priority benefit of Taiwan application serial no. 109107857, filed on Mar. 10, 2020. The entirety of the above-mentioned patent application is hereby incorporated by reference herein and made a part of this specification.

BACKGROUND

Technical Field

The disclosure relates to a doorbell system, and in particular, relates to a smart doorbell system and a chime circuit.

Description of Related Art

Nowadays, in almost every household, a doorbell system is installed, so that the homeowner may be conveniently informed of a visitor. At present, doorbells are mainly divided into mechanical doorbells and electronic doorbells. Most of the ringing sounds provided by the mechanical doorbells are monotonous, while beautiful musical ringing sounds are provided by the electronic doorbells, so that most of the house owners choose to install the electronic doorbells. Nevertheless, an electronic doorbell is driven by the DC direct voltage, but the household electricity is AC current. As a result, a worker cannot determine in advance the current direction applicable to the electronic doorbell during installation, which causes inconvenience in construction, and human efforts and time are thereby wasted.

SUMMARY

The disclosure provides a smart doorbell system and a chime circuit allowing selection of an applicable current direction.

An embodiment of the disclosure provides a smart doorbell system. The smart doorbell system includes a doorbell switch, an input device, a chime circuit, and a ring circuit. The chime circuit includes a power connection terminal, a first rectifier circuit and a second rectifier circuit. The power connection terminal is configured to receive an alternating current, and the alternating current includes a first direction current and a second direction current that alternate. The first rectifier circuit is coupled to the power connection terminal. The second rectifier circuit is coupled to the power connection terminal and is connected to the first rectifier circuit in parallel. The input device is coupled to the first rectifier circuit and the second rectifier circuit and is configured to generate a control signal. The control signal controls one of the first direction current and the second direction current from the power connection terminal to pass through a corresponding one of the first rectifier circuit and the second rectifier circuit. The doorbell switch is coupled to the chime circuit. A trigger signal is generated through the other one of the first direction current and the second direction current from the power connection terminal when the doorbell switch is pressed. The ring circuit is coupled to the doorbell switch and produces a ringing sound according to the trigger signal.

An embodiment of the disclosure provides a chime circuit. The chime circuit includes a power connection terminal, a first rectifier circuit, and a second rectifier circuit. The power connection terminal includes a first terminal and a second terminal. The first rectifier circuit is coupled to the power connection terminal and includes a first rectifier element, a first isolation element, and a first switch. An input terminal of the first rectifier element is coupled to the first terminal. The first isolation element is coupled to the first terminal. An input terminal of the first switch is coupled to an output terminal of the first rectifier element. A control terminal of the first switch is coupled to the first isolation element. An output terminal of the first switch is coupled to the second terminal. The second rectifier circuit is coupled to the power connection terminal and is connected to the first rectifier circuit in parallel. The second rectifier circuit includes a second rectifier element, a second isolation element, and a second switch. An input terminal of the second rectifier element is coupled to the second terminal. The second isolation element is coupled to the second terminal. An input terminal of the second switch is coupled to an output terminal of the second rectifier element. A control terminal of the second switch is coupled to the second isolation element. An output terminal of the second switch is coupled to the first terminal.

An embodiment of the disclosure provides a chime circuit. The chime circuit includes a power connection terminal, a first rectifier circuit, and a second rectifier circuit. The power connection terminal includes a first terminal and a second terminal. The first rectifier circuit is coupled to the power connection terminal and includes a first rectifier element, a first isolation element, and a first switch. An output terminal of the first rectifier element is coupled to the second terminal. The first isolation element is coupled to the second terminal. An output terminal of the first switch is coupled to an input terminal of the first rectifier element. A control terminal of the first switch is coupled to the first isolation element. An input terminal of the first switch is coupled to the first terminal. The second rectifier circuit is coupled to the power connection terminal and is connected to the first rectifier circuit in parallel. The second rectifier circuit includes a second rectifier element, a second isolation element, and a second switch. An output terminal of the second rectifier element is connected to the first terminal. The second isolation element is coupled to the first terminal. An output terminal of the second switch is coupled to the input terminal of the first rectifier element. A control terminal of the second switch is coupled to the second isolation element. An input terminal of the second switch is coupled to the second terminal.

To sum up, the disclosure provides the smart doorbell system and the chime circuit. The chime circuit at least includes the first rectifier circuit and the second rectifier circuit. The first rectifier circuit may allow the first direction current to pass through. The second rectifier circuit may allow the second direction current to pass through. When the ring circuit is required to receive the current of one of the directions, the control signal may choose to turn on one of the rectifier circuits and turn off the other rectifier circuit to provide the direct current required by the ring circuit.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
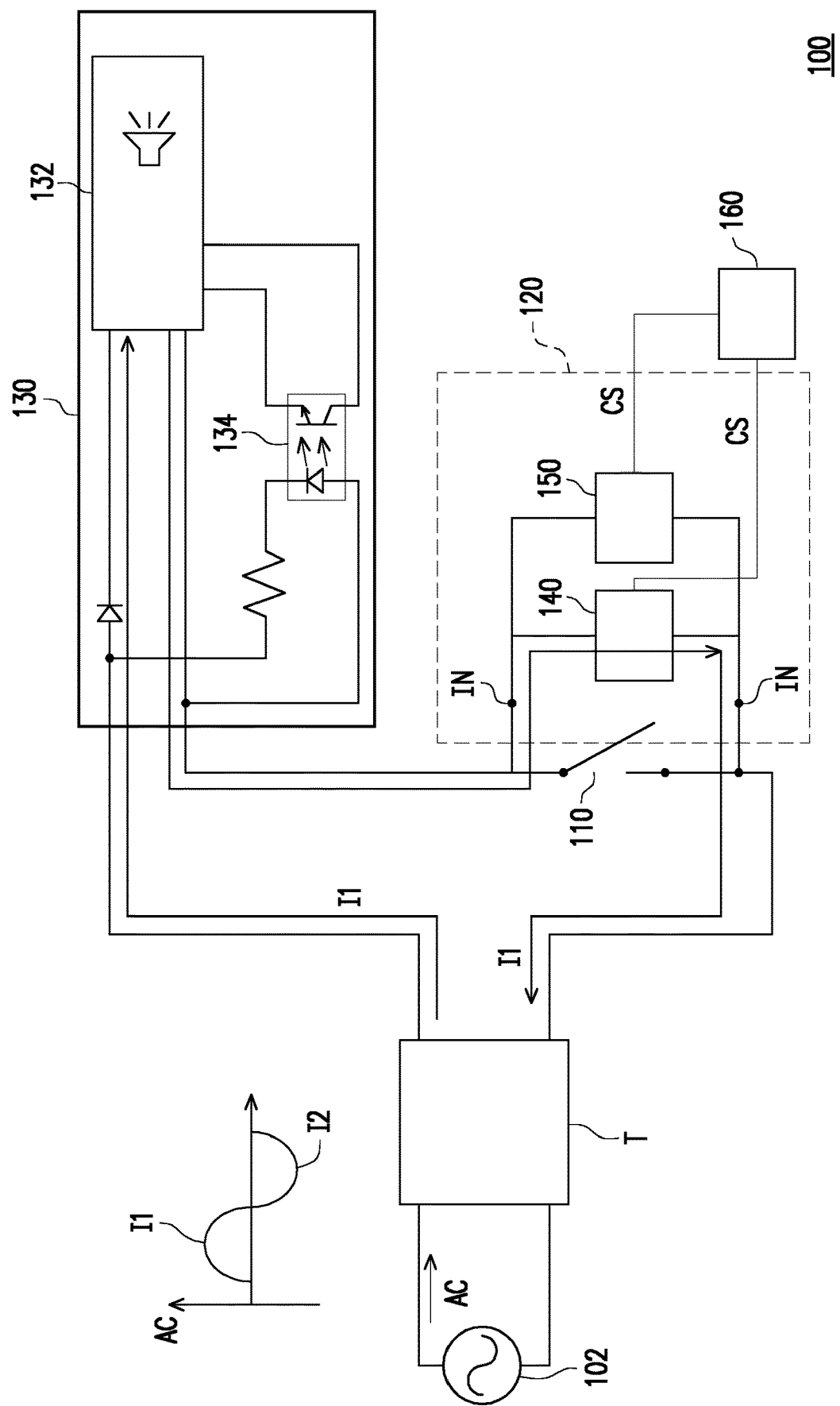
FIG. 1 is a schematic diagram of a smart doorbell system according to an embodiment of the disclosure.

FIG. 1 is a schematic diagram of a smart doorbell system according to an embodiment of the disclosure. With reference to FIG. 1, a smart doorbell system 100 includes a doorbell switch 110, a chime circuit 120, a ring circuit 130 and an input device 160. The doorbell switch 110 is, for example, a device such as a button, a rocker switch, or a touch panel. A trigger signal is generated when the doorbell switch 110 is turned on, such that the ring circuit 130 produces a ringing sound. The ring circuit 130 is, for example, a digital chime. The chime circuit 120 at least includes a power connection terminal IN, a first rectifier circuit 140, and a second rectifier circuit 150. The power connection terminal IN receives an alternating current AC from a power device 102. The alternating current AC includes a first direction current I1 and a second direction current I2 that alternate. The first direction current I1 and the second direction current I2 are direct currents of different directions. A transformer T may be disposed between the power device 102 and the power connection terminal IN. The first rectifier circuit 140 is coupled to the power connection terminal IN. The second rectifier circuit 150 is coupled to the power connection terminal IN and is connected to the first rectifier circuit 140 in parallel. The input device 160 is coupled to the first rectifier circuit 140 and the second rectifier circuit 150 and is configured to generate a control signal CS. The control signal CS controls one of the first direction current I1 and the second direction current I2 from the power connection terminal IN to pass through a corresponding one of the first rectifier circuit 140 and the second rectifier circuit 150. To be specific, the control signal CS controls the first direction current I1 from the power connection terminal IN to pass through the first rectifier circuit 140 or the second direction current I2 from the power connection terminal IN to pass through the second rectifier circuit 150. The doorbell switch 110 is coupled to the chime circuit 120 and generates the trigger signal through another one of the first direction current I1 and the second direction current I1 from the power connection terminal IN when being pressed, such that the ring circuit 130 produces a ringing sound.

The input device 160 is, for example, a user input device such as a communication element, a button, or a touchpad. In the case that the input device 160 is a communication element, the input device 160 may receive the control signal CS from a host through a wired or wireless transmission manner. The control signal CS selects at least one of the first rectifier circuit 140 and the second rectifier circuit 150 to be turned off. In other embodiments, in the case that the input device 160 is a user input device, a user may manually input the control signal CS through the input device 160. For instance, the user may determine to turn on the first rectifier circuit 140 or the second rectifier circuit 150 by flipping a switch (the input device 160) or may determine to turn off both of them. Note that the control signal CS is inputted during an installation process of the smart doorbell system 100. After installation is completed, unless the ring circuit 130 is to be replaced, the turning-on state of the first rectifier circuit 140 and the second rectifier circuit 150 is not required to be changed.

In the embodiment of FIG. 1, the doorbell switch 110 is turned off, the first rectifier circuit 140 allows the first direction current I1 to pass through according to the control signal CS, and the second rectifier circuit 150 is turned off. The first direction current I1 is configured to provide power to the ring circuit 130. In other words, the ring circuit 130 receives the first direction current I1 to maintain power.

Figure 2:
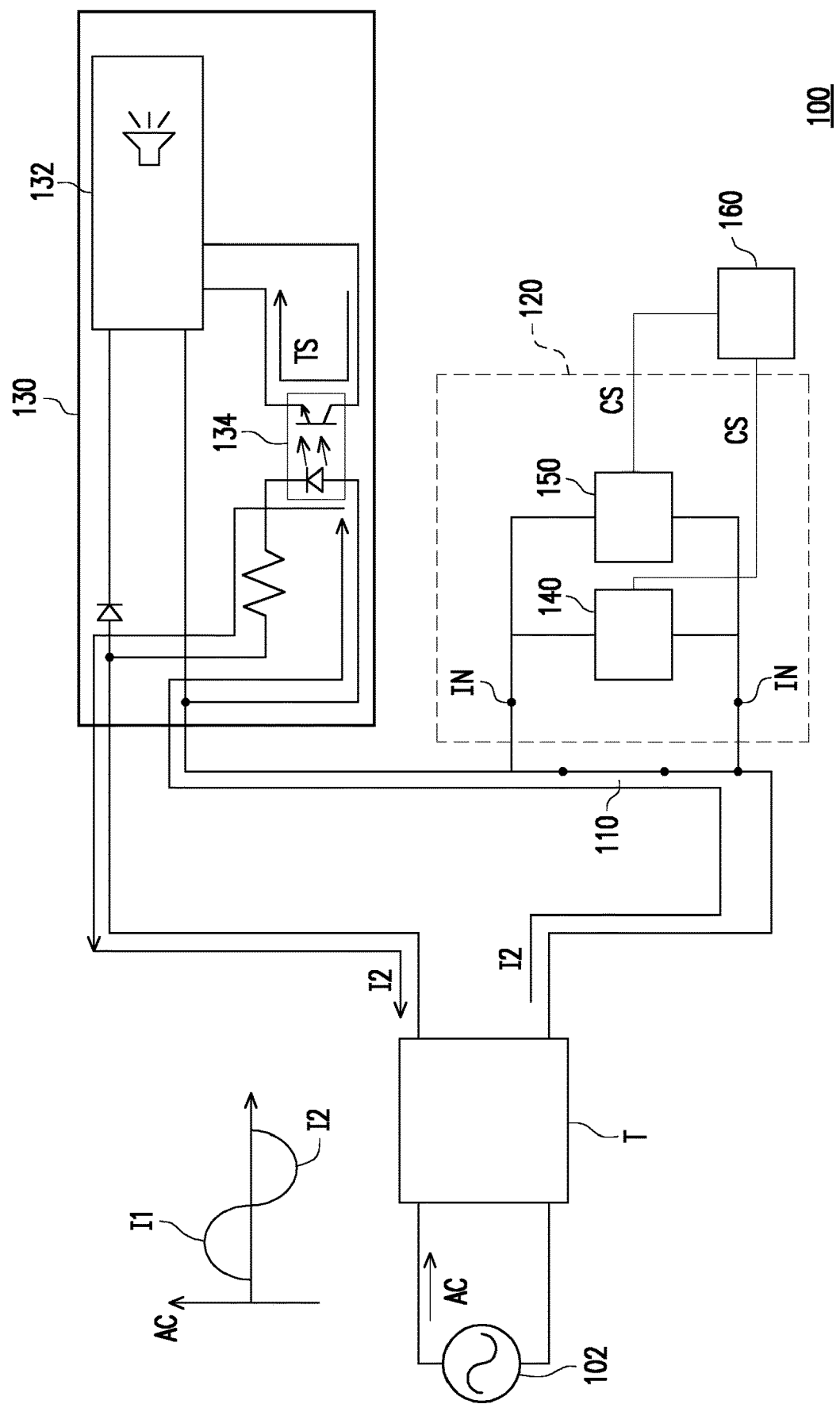
FIG. 2 is another schematic diagram of the smart doorbell system according to the embodiment of FIG. 1.

FIG. 2 is another schematic diagram of the smart doorbell system according to the embodiment of FIG. 1. With reference to FIG. 2, the doorbell switch 110, the first rectifier circuit 140, and the second rectifier circuit 150 are connected in parallel. Herein, the doorbell switch 110 is in a turning-on state. The second direction current I2 may pass through the doorbell switch 110 to generate the trigger signal TS to trigger the ring circuit 130. The ring circuit 130 includes a speaker 132 and a trigger element 134. The speaker 132 is configured to produce a ringing sound. After being turned on by the second direction current I2, the trigger element 134 sends out the trigger signal TS to enable the ring circuit 130 to start playing the ringing sound.

In short, in the smart doorbell system 100 provided by the present embodiment, the control signal CS may be inputted according to a wiring design of the ring circuit 130. The control signal CS determines which direction of the direct current is to be outputted to the ring circuit 130 for power supply and generates the trigger signal TS by using the direct current of another direction.

Figure 3:
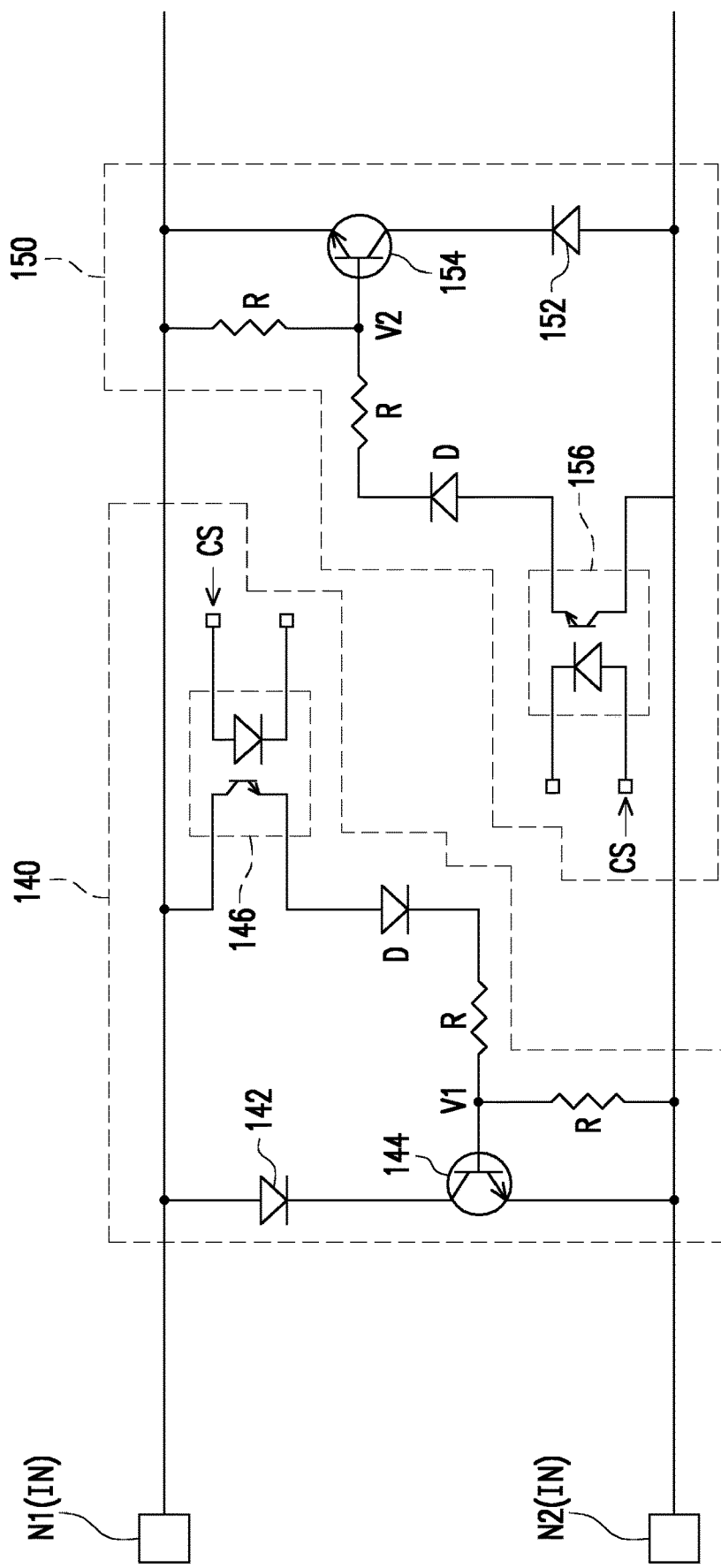
FIG. 3 is a schematic diagram of circuits of a first rectifier circuit and a second rectifier circuit according to an embodiment of the disclosure.

FIG. 3 is a schematic diagram of circuits of a first rectifier circuit and a second rectifier circuit according to an embodiment of the disclosure. With reference to FIG. 3, the first rectifier circuit 140 at least includes a first rectifier element 142, a first switch 144 and a first isolation element 146. The first isolation element 146 is configured to generate a corresponding first high voltage level or a first low voltage level according to the control signal CS. If the first isolation element 146 generates the first high voltage level, a first node voltage V1 in FIG. 3 is at a high voltage level. If the first isolation element 146 generates the first low voltage level, the first node voltage V1 in FIG. 3 is at a low voltage level. The first isolation element 146 acts as a photo coupler as an example. The first isolation element 146 is configured to block the control signal CS and the alternating current AC from affecting each other.

A control terminal of the first switch 144 is coupled to the first isolation element 146, such that the first switch 144 is turned on when the first isolation element 146 generates the first high voltage level and is turned off when the first isolation element 146 generates the first low voltage level. That is, the first switch 144 is controlled by the first node voltage V1 to determine whether to be turned on. The first switch 144 acts as, but not limited to, an NPN bipolar junction transistor (BJT) as an example herein.

An input terminal of the first rectifier element 142 is coupled to a first terminal N1 of the power connection terminal IN and is connected to the first switch 144 in series. The first rectifier element 142 is configured to allow the first direction current I1 to pass through and prevent the second direction current I2 from passing through. The first rectifier element 142 is, but not limited to, a diode, for example.

The second rectifier circuit 150 at least includes a second rectifier element 152, a second switch 154 and a second isolation element 156. The second isolation element 156 is configured to generate a corresponding second high voltage level or a second low voltage level according to the control signal CS. If the second isolation element 156 generates the second high voltage level, a second node voltage V2 in FIG. 3 is at the high voltage level. If the second isolation element 156 generates the second low voltage level, the second node voltage V2 in FIG. 3 is at the low voltage level. Herein, the second isolation element 156 acts as a photo coupler as an example. The second isolation element 156 is configured to block the control signal CS and the alternating current AC from affecting each other.

A control terminal of the second switch 154 is coupled to the second isolation element 156, such that the second switch 154 is turned on when the second isolation element 156 generates the second high voltage level and is turned off when the second isolation element 156 generates the second low voltage level. That is, the second switch 154 is controlled by the second node voltage V2 to determine whether to be turned on. The second switch 154 acts as, but not limited to, an NPN BJT as an example herein.

The second rectifier element 152 is connected to the second switch 154 in series. The second rectifier element 152 is configured to allow the second direction current I2 to pass through and prevent the first direction current I1 from passing through. The second rectifier element 152 is, but not limited to, a diode, for example.

Since directions of the currents to be turned on by the first rectifier circuit 140 and the second rectifier circuit 150 are different, circuit configurations of the two are opposite.

To be more specific, in FIG. 3, the input terminal of the first rectifier element 142 is connected to the first terminal N1, and an output terminal of the first rectifier element 142 is connected to an input terminal of the first switch 144. An output terminal of the first switch 144 is connected to a second terminal N2. The first isolation element 146 is connected between the first terminal N1 and the control terminal of the first switch 144 and determines whether to turn on the first switch 144 according to the control signal CS.

An input terminal of the second rectifier element 152 is connected to the second terminal N2, and an output terminal of the second rectifier element 152 is connected to an input terminal of the second switch 154. An output terminal of the second switch 154 is connected to the first terminal N1. The second isolation element 156 is connected between the second terminal N1 and the control terminal of the second switch 154 and determines whether to turn on the second switch 154 according to the control signal CS. Besides, other elements, such as a diode D and a resistor R, may be disposed between the first isolation element 146 and the control terminal of the first switch 144 or between the second isolation element 156 and the second switch 154, which is not particularly limited by the disclosure.

In another embodiment, the ring circuit 130 is a mechanical doorbell, and an installer may adjust the control signal CS to turn off both the first rectifier circuit 140 and the second rectifier circuit 150.

Figure 4:
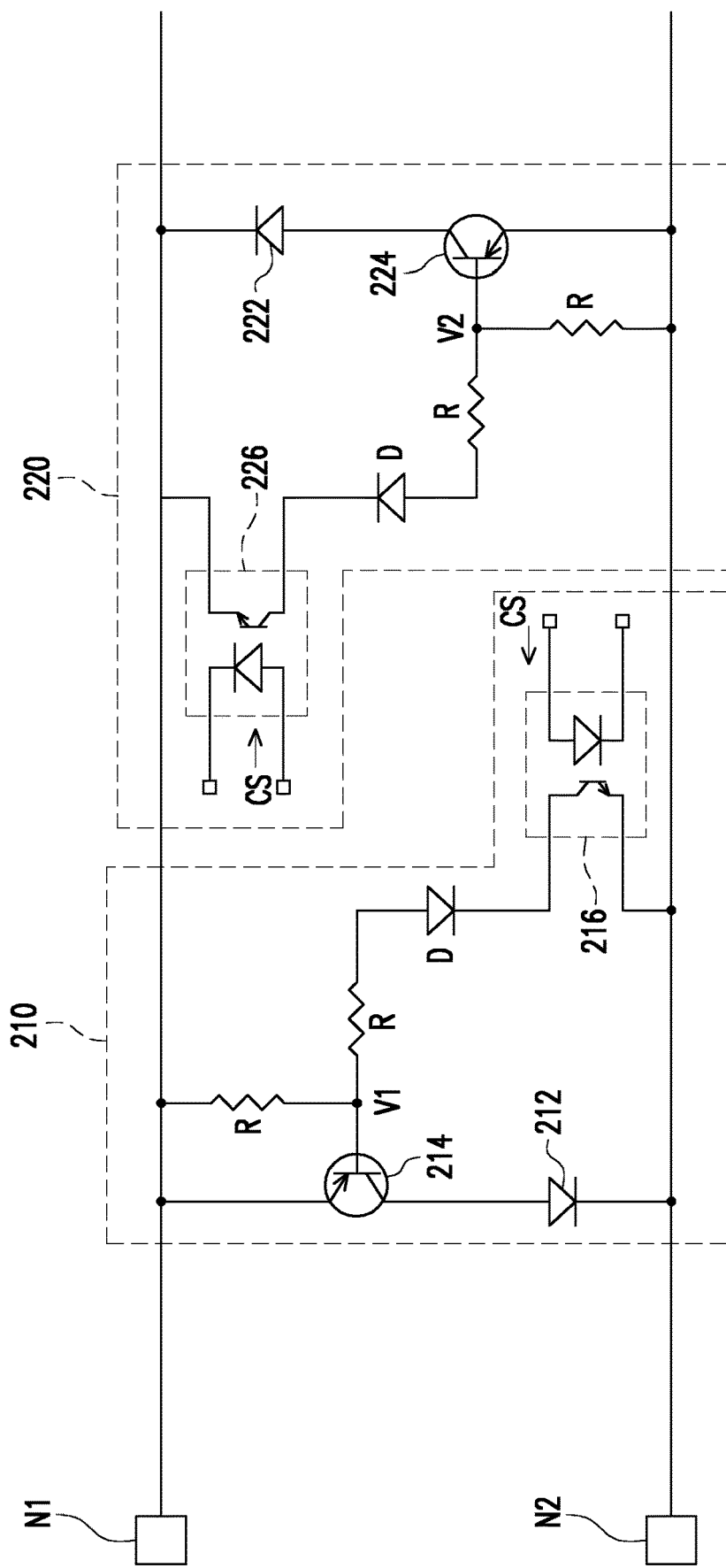
FIG. 4 is a schematic diagram of circuits of a first rectifier circuit and a second rectifier circuit according to another embodiment of the disclosure.

FIG. 4 is a schematic diagram of circuits of a first rectifier circuit and a second rectifier circuit according to another embodiment of the disclosure. A first rectifier circuit 210 and a second rectifier circuit 220 provided in FIG. 4 may be suited to the first rectifier circuit 140 and the second rectifier circuit 150 provided in FIG. 1. A difference between the circuits in FIG. 3 and FIG. 4 is that: the first switch 144 and the second switch 154 in FIG. 3 are NPN BJTs while a first switch 214 and a second switch 224 in FIG. 4 are PNP BJTs.

To be more specific, an output terminal of the first switch 214 is connected to the first terminal N1. An input terminal of a first rectifier element 212 is connected to an output terminal of the first switch 214. An output terminal of the first rectifier element 212 is connected to the second terminal N2. A first isolation element 216 is connected between the second terminal N2 and a control terminal of the first switch 214 and determines whether to turn on the first switch 214 according to the control signal CS.

An input terminal of the second switch 224 is connected to the second terminal N2, and an output terminal of the second switch 224 is connected to an input terminal of a second rectifier element 222. An output terminal of the second rectifier element 222 is connected to the first terminal N1. A second isolation element 226 is connected between the first terminal N1 and a control terminal of the second switch 224 and determines whether to turn on the second switch 224 according to the control signal CS.

Similarly, the first rectifier circuit 210 and the second rectifier circuit 220 may further include other elements, such as the diode D and the resistor R, which is not particularly limited by the disclosure.

Sufficient description, suggestions, and teachings, may be obtained by a person of ordinary skill in the art from the embodiments of FIG. 3, so as to know the implementation of the embodiments of FIG. 4, and repeated description is thus not provided herein.

In view of the foregoing, the disclosure provides the smart doorbell system and the chime circuit. The chime circuit at least includes the first rectifier circuit and the second rectifier circuit. One of the first rectifier circuit and the second rectifier circuit is chosen to be activated through the control signal, so that the correct direct current is provided to the ring circuit. Therefore, during construction, if the initial installation manner of the smart doorbell system is not suitable for the wiring of the ring circuit, a worker only needs to adjust the direction of the direct current by changing the control signal without disassembling and reinstalling the system. In this way, the construction procedures may be significantly simplified and the purpose of smart installation is achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A smart doorbell system, comprising:
   a chime circuit, comprising:
   a power connection terminal, configured to receive an alternating current, wherein the alternating current comprises a first direction current and a second direction current;
   a first rectifier circuit, coupled to the power connection terminal; and
   a second rectifier circuit, coupled to the power connection terminal and connected to the first rectifier circuit in parallel;
   an input device, coupled to the first rectifier circuit and the second rectifier circuit and configured to generate a control signal, wherein the control signal controls one of the first direction current and the second direction current from the power connection terminal to pass through a corresponding one of the first rectifier circuit and the second rectifier circuit;

a doorbell switch, coupled to the chime circuit, wherein when the doorbell switch is pressed, a trigger signal is generated through the other one of the first direction current and the second direction current from the power connection terminal; and a ring circuit, coupled to the doorbell switch and producing a ringing sound according to the trigger signal.

2. The smart doorbell system according to claim 1, wherein the first rectifier circuit comprises:

a first isolation element, configured to generate a first high voltage level or a first low voltage level according to the control signal; and a first switch, wherein a control terminal of the first switch is coupled to the first isolation element, such that the first switch is turned on when the first isolation element generates the first high voltage level and is turned off when the first isolation element generates the first low voltage level.

3. The smart doorbell system according to claim 2, wherein the first rectifier circuit further comprises:

a first rectifier element, connected to the first switch in series, wherein the first rectifier element is configured to allow the first direction current to pass through and prevent the second direction current from passing through.

4. The smart doorbell system according to claim 2, wherein the first isolation element is configured to block the control signal and the alternating current from affecting each other.

5. The smart doorbell system according to claim 2, wherein the first isolation element is a photo coupler.

6. The smart doorbell system according to claim 2, wherein the second rectifier circuit comprises:

a second isolation element, configured to generate a second high voltage level or a second low voltage level according to the control signal; and a second switch, wherein a control terminal of the second switch is coupled to the second isolation element, such that the first switch is turned on when the second isolation element generates the second high voltage level and is turned off when the second isolation element generates the second low voltage level.

7. The smart doorbell system according to claim 6, wherein the second rectifier circuit further comprises:

a second rectifier element, connected to the second switch in series, wherein the second rectifier element is configured to allow the second direction current to pass through and prevent the first direction current from passing through.

8. The smart doorbell system according to claim 1, wherein the first rectifier circuit comprises:

a first isolation element, configured to generate a first high voltage level or a first low voltage level according to the control signal; and a first switch, wherein a control terminal of the first switch is coupled to the first isolation element, such that the first switch is turned on when the first isolation element generates the first low voltage level and is turned off when the first isolation element generates the first high voltage level;

wherein the second rectifier circuit comprises:

a second isolation element, configured to generate a second high voltage level or a second low voltage level according to the control signal; and a second switch, wherein a control terminal of the second switch is coupled to the second isolation element, such that the second switch is turned on when the second isolation element generates the second low voltage level and is turned off when the second isolation element generates the second high voltage level.

9. The smart doorbell system according to claim 1, wherein the ring circuit receives one of the first direction current and the second direction current to maintain power.

10. A chime circuit, comprising:

a power connection terminal, comprising a first terminal and a second terminal;

a first rectifier circuit, coupled to the power connection terminal, wherein the first rectifier circuit comprises:

a first rectifier element, comprising an input terminal and an output terminal, wherein the input terminal is coupled to the first terminal;

a first isolation element, coupled to the first terminal; and a first switch, wherein an input terminal of the first switch is coupled to the output terminal of the first rectifier element, a control terminal of the first switch is coupled to the first isolation element, and an output terminal of the first switch is coupled to the second terminal; and a second rectifier circuit, coupled to the power connection terminal and connected to the first rectifier circuit in parallel, wherein the second rectifier circuit comprises:

a second rectifier element, comprising an input terminal and an output terminal, wherein the input terminal is coupled to the second terminal;

a second isolation element, coupled to the second terminal; and a second switch, wherein an input terminal of the second switch is coupled to the output terminal of the second rectifier element, a control terminal of the second switch is coupled to the second isolation element, and an output terminal of the second switch is coupled to the first terminal.

11. A chime circuit, comprising:

a power connection terminal, comprising a first terminal and a second terminal;

a first rectifier circuit, coupled to the power connection terminal, wherein the first rectifier circuit comprises:

a first rectifier element, comprising an input terminal and an output terminal, wherein the output terminal is coupled to the second terminal;

a first isolation element, coupled to the second terminal; and a first switch, wherein an output terminal of the first switch is coupled to the input terminal of the first rectifier element, a control terminal of the first switch is coupled to the first isolation element, an input terminal of the first switch is coupled to the first terminal; and a second rectifier circuit, coupled to the power connection terminal and connected to the first rectifier circuit in parallel, wherein the second rectifier circuit comprises:

a second rectifier element, comprising an input terminal and an output terminal, wherein the output terminal is coupled to the first terminal;

a second isolation element, coupled to the first terminal; and a second switch, wherein an output terminal of the second switch is coupled to the input terminal of the first rectifier element, a control terminal of the second switch is coupled to the second isolation element, and an input terminal of the second switch is coupled to the second terminal.

\* \* \* \* \*